(12) United States Patent
Niwa et al.

(10) Patent No.: US 7,946,622 B2
(45) Date of Patent: May 24, 2011

(54) EXTERNAL AND INTERNAL AIRBAG TETHER ARRANGEMENT

(75) Inventors: Minoru Niwa, West Bloomfield, MI (US); Tanja Kryzaniwskyj, Warren, MI (US); Stephanie Schneider, Ferndale, MI (US)

(73) Assignee: Toyoda Gosei Co. Ltd. (JP)

( * ) Notice: Subject to any disclaimer, the term of this patent is extended or adjusted under 35 U.S.C. 154(b) by 128 days.

(21) Appl. No.: 12/103,727

(22) Filed: Apr. 16, 2008

(65) Prior Publication Data

US 2009/0261563 A1  Oct. 22, 2009

(51) Int. Cl.
*B60R 21/16* (2006.01)
(52) U.S. Cl. ..................................... 280/743.2
(58) Field of Classification Search ............... 280/743.2, 280/743.1, 739
See application file for complete search history.

(56) References Cited

U.S. PATENT DOCUMENTS

| | | | | |
|---|---|---|---|---|
| 5,004,266 A * | 4/1991 | Miller et al. | ................ | 280/743.2 |
| 6,634,671 B2 * | 10/2003 | Heigl et al. | ................ | 280/743.2 |
| 6,648,371 B2 * | 11/2003 | Vendely et al. | ................ | 280/739 |
| 6,883,831 B2 * | 4/2005 | Hawthorn et al. | ............ | 280/739 |
| 7,111,871 B2 * | 9/2006 | Thomas | ..................... | 280/743.2 |
| 7,144,036 B2 * | 12/2006 | Kai | ............................... | 280/731 |
| 7,152,879 B2 * | 12/2006 | Kai | ............................... | 280/743.2 |
| 7,377,548 B2 * | 5/2008 | Bauer et al. | ................ | 280/743.2 |
| 7,631,895 B2 * | 12/2009 | Kalliske et al. | ............ | 280/743.2 |

\* cited by examiner

*Primary Examiner* — Faye M. Fleming
(74) *Attorney, Agent, or Firm* — Carlson Gaskey & Olds PC

(57) ABSTRACT

An example tethered airbag arrangement includes an airbag movable to an expanded position. The airbag includes a contact face. An internal tether constrains expansion of the contact face. An external tether also constrains expansion of the contact face.

21 Claims, 2 Drawing Sheets

EXTERNAL AND INTERNAL AIRBAG TETHER ARRANGEMENT

BACKGROUND

This invention relates to constraining an airbag during deployment using an external tether and an internal tether.

Known airbag arrangements protect vehicle occupants by absorbing forces generated during collisions, for example. Many airbag arrangements are used in conjunction with other vehicle safety systems, such as seat belts. Safety systems having airbag arrangements protect occupants located in various positions within the vehicle.

Forces transfer between an occupant and an airbag when the occupant contacts the airbag during a collision, for example. Generally, it is desirable to contact the occupant with a substantially planar, vertically-orientated airbag contact face when the airbag is fully expanded, as this orientation often enhances force absorption. As known, the occupant can often more effectively absorb forces through their chest or thorax area than through their head and neck. Manipulating the airbag's orientation when the airbag contacts the occupant can affect the distribution of forces on the occupant. Manipulating the orientation of the airbag is often difficult due in part to rapid inflation of the airbag from a folded position.

SUMMARY

An example tethered airbag arrangement includes an airbag movable to an expanded position. The airbag includes a contact face. An internal tether constrains expansion of the contact face. An external tether also constrains expansion of the contact face.

Another example tethered airbag arrangement includes an airbag having a contact face. The airbag includes an upper airbag section and lower airbag section. The airbag includes an airbag contact face. An internal tether constrains expansion of the airbag contact face. An external tether constrains expansion of the upper airbag section.

Yet another example tethered airbag arrangement includes an airbag movable to an expanded position. An internal tether connects a base of the airbag and a contact face of the airbag. An external tether connects a base of the airbag and a contact face of the airbag.

These and other features of the example disclosure can be best understood from the following specification and drawings, the following of which is a brief description:

DETAILED DESCRIPTION OF THE PREFERRED EMBODIMENT

Figure 1:
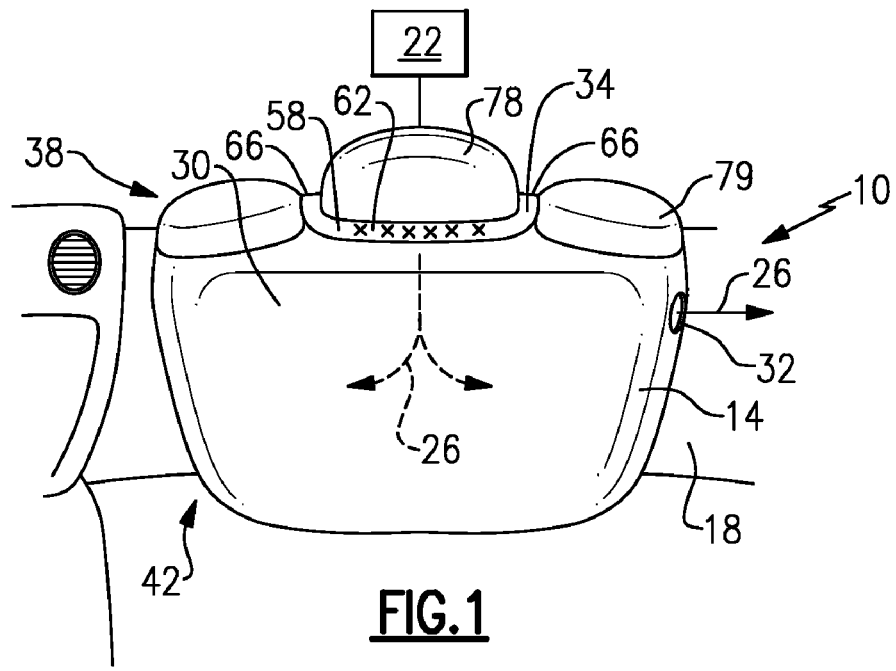
FIG. 1 shows a front view of an example tethered airbag arrangement having the airbag in an expanded position.

Referring to FIG. 1, an example tethered airbag arrangement 10 includes an airbag 14, which is expandable within a vehicle 18. An inflator 22, represented schematically here, generates gas 26 for inflating the airbag 14. Some of the gas 26 escapes through vents 32 in the airbag 14. As known, vents 32 may be used to control the perceived hardness, softness, or both of the airbag 14.

Figure 2:
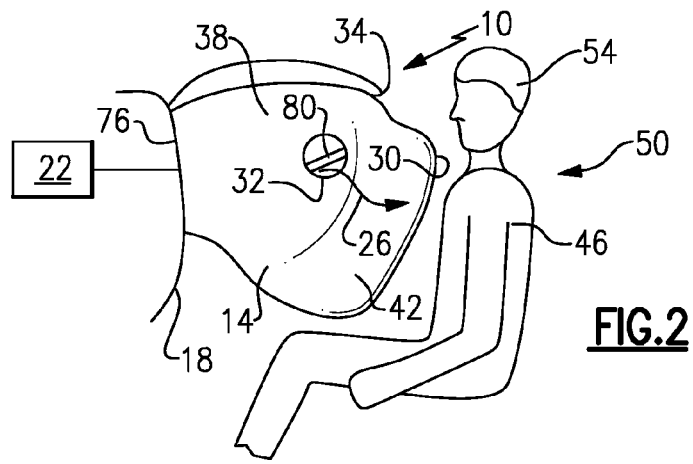
FIG. 2 shows a side view of the FIG. 1 tethered airbag arrangement positioned near an occupant.
Figure 3:
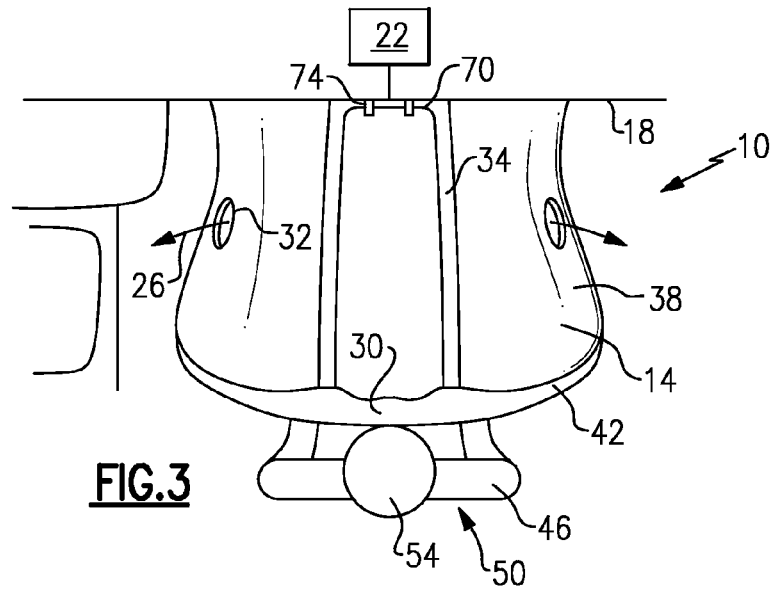
FIG. 3 shows a top view of the FIG. 1 tethered airbag arrangement and the occupant.

Referring now to FIGS. 2 and 3 with continuing reference to FIG. 1, in these examples, the airbag 14 is shown in an expanded position or a position appropriate for absorbing force from an occupant 50. During a collision for example, the airbag 14 expands and moves toward the occupant 50 as the occupant 50 moves toward the airbag 14. Eventually, the occupant 50 contacts a contact face 30 of the airbag 14. As known, the airbag 14 absorbs force from the occupant 50.

In this example, an external tether 34 constrains areas of the airbag 14 to alter the profile of the contact face 30, which affects the force absorption characteristics of the airbag 14. The external tether 34 constrains an upper section 38 of the airbag 14, but not a lower section 42 of the airbag 14, in this example. Accordingly, the chest area 46 or thorax area of the occupant 50 contacts the lower section 42 of the airbag prior to a head 54 and neck of the occupant 50 contacting the upper section 38 of the airbag 14, for example. Thus, the head 54 of the occupant 50 is impacted at a delayed time than the chest area 46.

Stitching 58 secure one end of the external tether 34 to the airbag 14. In this example, a central strap section 62 of the external tether 34 is secured to the airbag 14 with the stitching 58. Individual tethers 66 of the external tether 34 extend away from the central strap section 62 and connect the central strap section 62 adjacent a base 70 of the airbag 14. The base 70 includes a fixture (not shown) that holds the airbag 14 when the airbag 14 is folded. The external tether 34 is anchored near the base 70 using at least one bolt 74 near the base 70.

As perhaps best shown in FIG. 1, the example external tether 34 causes a "W" profile in the upper section 38 due to the airbag 14 bulging around the tethers 66 and the central strap section 62. In this example, a middle portion 78 of the upper section 38 extends vertically upward further than outer portions 79 of the upper section 38. In this example, the middle portion 78, or the portion between the individual tethers 66, provides clearance for accommodating, at a minimum, the head width of a 3-6 year old.

In some examples, the external tether 34 is a breakable or expandable tether, in such examples, the external tether 34 may constrain the contact face 30, the upper section 38, or both as the airbag 14 deploys rather than only when the airbag 14 is fully deployed.

Figure 5:
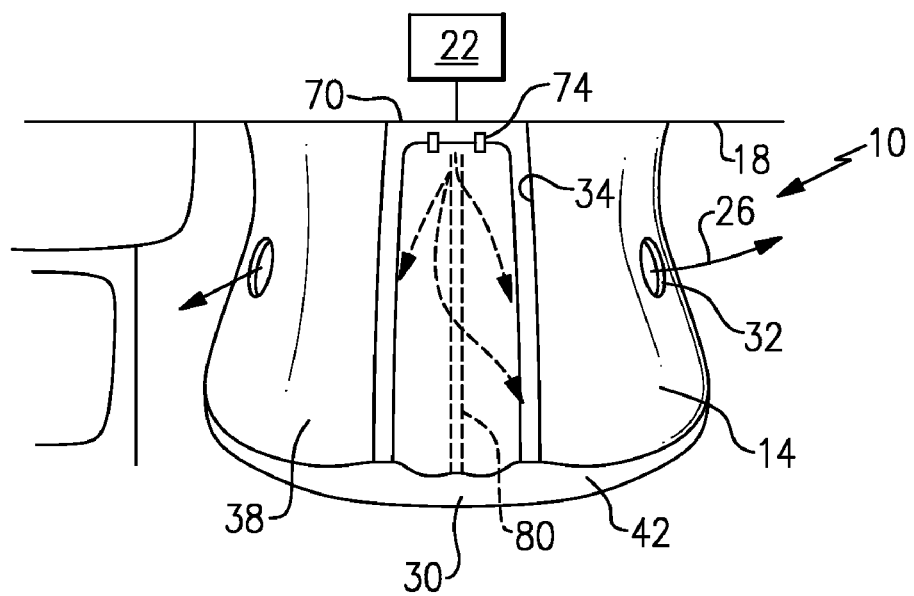
FIG. 5 shows another top view of the FIG. 1 tethered airbag arrangement.
Figure 4:
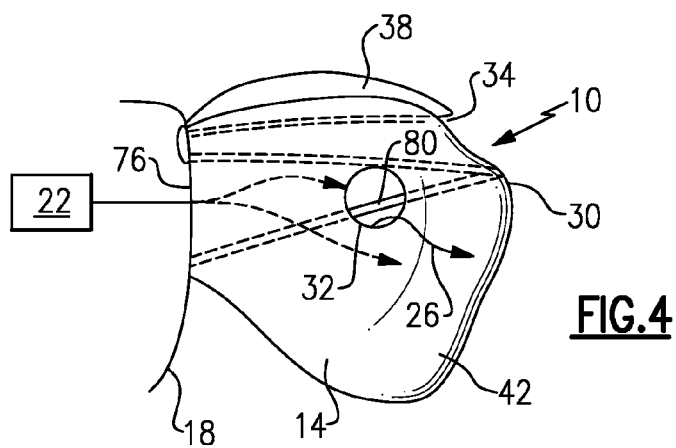
FIG. 4 shows another side view of the FIG. 1 tethered airbag arrangement.

Referring now to FIGS. 4 and 5 with continuing reference to FIG. 2, the example tethered airbag arrangement 10 also includes an internal tether 80 for restraining the contact face 30. The internal tether 80 holds the airbag 14 during deployment to allow the lower section 42 to deploy more quickly. Deploying the lower section 42 in this manner facilitates expanding the contact face 30 in an appropriate orientation for absorbing force from the occupant 50.

In this example, the internal tether 80 includes two individual tethers extending from the contact face 30 toward the base 76 of the airbag 14. In this example, the internal tether 80 is formed from a single strip of material, which is folded and sewn adjacent the contact face 30 while the remaining ends are secured using the at least one bolt 74, for example, near the base 76 of the airbag 14.

Although a preferred embodiment has been disclosed, a worker of ordinary skill in this art would recognize that certain modifications would come within the scope of this invention. For that reason, the following claims should be studied to determine the true scope and content of this invention.

We claim:

1. A tethered airbag arrangement, comprising:
    an airbag moveable to an expanded position, said airbag having a contact face;
    an internal tether for constraining expansion of said contact face; and
    an external tether for constraining expansion of said contact face, wherein the internal tether is disposed in an interior of the airbag, the interior distinct from an exterior of the airbag.

2. The tethered airbag arrangement of claim 1, wherein a first end of said external tether is secured adjacent said contact face, and a second end of said external tether is secured adjacent a base of said airbag.

3. The tethered airbag arrangement of claim 2, wherein a central strap section of said first end of said external tether is aligned with said airbag contact face.

4. The tethered airbag arrangement of claim 1, wherein said external tether is secured to said airbag vertically above said internal tether.

5. The tethered airbag arrangement of claim 1, wherein said external tether includes at least two tethers.

6. The tethered airbag arrangement of claim 1, wherein said external tether limits expansion of said airbag toward a vehicle occupant.

7. A tethered airbag arrangement, comprising:
    an airbag moveable to an expanded position, said airbag having a contact face;
    an internal tether for constraining expansion of said contact face; and
    an external tether for constraining expansion of said contact face, wherein said airbag includes an upper airbag section and a lower airbag section, said external tether for constraining expansion of said upper airbag section, wherein said upper airbag section includes a central portion and at least two outer portions each extending vertically further from said lower airbag section than a portion of said upper airbag section near said external tether when said airbag is in the expanded position.

8. The tethered airbag arrangement of claim 7, wherein said external tether constrains said upper airbag section to form said central portion and said at least two outer portions.

9. The tethered airbag arrangement of claim 7, wherein said central portion is positioned between tethers of said external tether.

10. The tethered airbag arrangement of claim 7, wherein said central portion extends vertically further from said lower airbag section than said at least two outer portions.

11. The tethered airbag arrangement of claim 1, wherein said external tether is a first external tether, the tethered airbag arrangement further comprising a second external tether.

12. A tethered airbag arrangement, comprising:
    an airbag having a contact face, said airbag having an upper airbag section and a lower airbag section, said airbag establishing an airbag interior that is separated from an airbag exterior by the airbag;
    an internal tether for constraining expansion of said contact face, the internal tether disposed entirely within the airbag interior ; and
    an external tether for constraining expansion of said upper airbag section the external tether disposed entirely within the airbag exterior.

13. The tethered airbag arrangement of claim 12, wherein said internal tether is a dual tether.

14. The tethered airbag arrangement of claim 12, wherein said internal tether includes a first end anchored adjacent said contact face and a second ends located apart from said contact face.

15. The tethered airbag arrangement of claim 12, wherein said external tether is a first external tether, the tethered airbag arrangement further comprising a second external tether.

16. The tethered airbag arrangement of claim 12, wherein said internal tether is a first internal tether, the tethered airbag arrangement further comprising a second internal tether.

17. A tethered airbag arrangement, comprising:
    an airbag moveable to an expanded position, the airbag establishing an airbag interior area that is separate from an airbag exterior area;
    an internal tether connecting a base of said airbag and a contact face of said airbag, the internal tether disposed within the airbag interior area; and
    an external tether connecting a base of said airbag and a contact face of said airbag, the external tether disposed within the airbag exterior area.

18. The tethered airbag arrangement of claim 17, wherein said external tether and said internal tether each include at least two tethers having respective first tether ends and second tether ends, said first tether ends secured to base portion of said airbag and said second tether ends secured adjacent said contact face.

19. The tethered airbag arrangement of claim 1, wherein an upper airbag section includes a central portion and at least two outer portions each extending vertically further from said lower airbag section than a portion of said upper airbag section near said external tether when said airbag is in the expanded position.

20. The tethered airbag arrangement of claim 1, wherein said external tether constrains an upper airbag section of said airbag such that said upper airbag section has a W profile when the airbag is in the expanded position.

21. The tethered airbag arrangement of claim 1, wherein the internal tether is disposed in an interior of the airbag, the interior separated from an exterior of the airbag by the airbag.

* * * * *